Patented Aug. 31, 1948

2,448,338

UNITED STATES PATENT OFFICE 2,448,338

AMINOTRIAZINE-ALDEHYDE CONDENSATION PRODUCTS WITH LINOLENIC ACID MONOGLYCERIDE AND PROCESS OF MAKING SAME

Gustav Widmer, Basel, and Willi Fisch, Binningen, Switzerland, assignors to Ciba Products Corporation, Hoboken, N. J.

No Drawing. Application March 6, 1945, Serial No. 581,347

2 Claims. (Cl. 260—21)

This invention is concerned with aldehyde condensation products of triazines of the formula

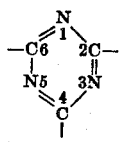

wherein at least one of the free valencies is substituted by an amine group. It comprises the process of manufacture thereof and the new products themselves, as well as their application in the industry.

This application is a continuation in part of our copending application Ser. No. 340,199 filed June 12, 1940, now Patent No. 2,387,547, Oct. 23, 1945, which is itself a continuation in part of our application Ser. No. 68,355 filed March 11, 1936 (now Patent No. 2,310,004). It relates to etherified aminotriazine-formaldehyde condensation products and particularly to such etherified aminotriazine methylol compounds the ether groups of which are derived from polyalcohols partially esterified with monobasic organic acids; such ether compounds being particularly useful as lacquer and varnish bases.

As typical examples of amino-triazines there may be mentioned the 2:4:6-triamino-1:3:5-triazine[$C_3N_3(NH_2)_3$] of the formula

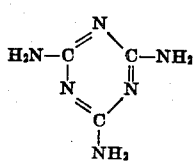

which is commonly called melamine, 2:4-diamino-1:3:5-triazine (formoguanamine) (Formula I), 2-amino-1:3:5-triazine (Formula II)

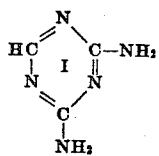 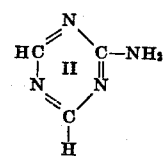

further melam (Formula III), melem (Formula IV), melon (Formula V) which products may be considered as derived from melamine by partial desamidation

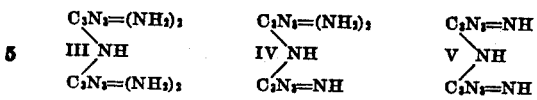

[cf. Journ. Am. Chem. Soc., 44, I, 486 (1922)], or the products wherein one or two amino groups are substituted by hydroxy, halogen, alkyl, aryl or aralkyl groups, such as for instance 2-hydroxy-4:6-diamino-1:3:5 - triazine (ammeline) (Formula VI), 2:4-hydroxy-6-amino-1:3:5-triazine (ammelide) (Formula VII)

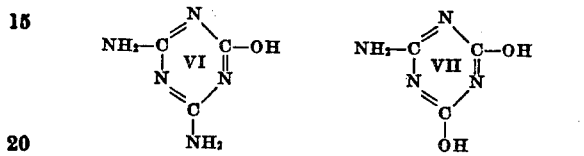

2-chloro-4:6-diamino-1:3:5 - triazine (Formula VIII), 2-phenyl-p-hydroxy-4:6-diamino-1:3:5-triazine (Formula IX), 2-phenyl-4-amino-6-hydroxy-1:3:5-triazine (Formula X)

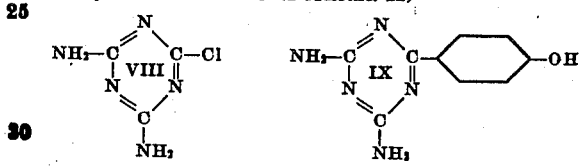

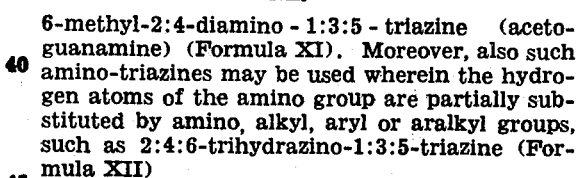

6-methyl-2:4-diamino - 1:3:5 - triazine (acetoguanamine) (Formula XI). Moreover, also such amino-triazines may be used wherein the hydrogen atoms of the amino group are partially substituted by amino, alkyl, aryl or aralkyl groups, such as 2:4:6-trihydrazino-1:3:5-triazine (Formula XII)

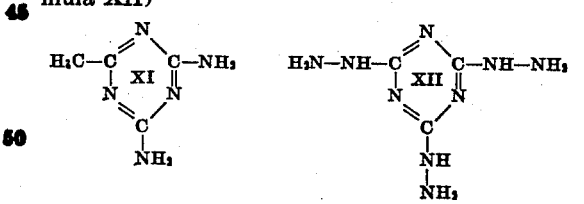

mono-di- or trialkyl-melamines, for instance 2:4:6-triethyl-triamino-1:3:5-triazine (Formula XIII), mono-di- or triaralkyl- or mono-di- or triaryl-melamines, for instance 2:4:6-triphenyl-triamino-1:3:5-triazine (Formula XIV)

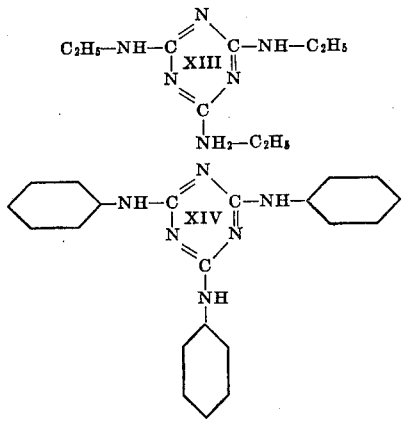

As is known, the triazines are conceivable also in an isoform of the following formula:

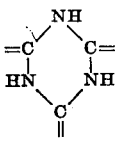

Of course in the case of this isoform also the hydrogen atoms of the cyclic imino groups may be substituted.

As aldehydes there may be used aliphatic aldehydes, such as for instance formaldehyde, acetaldehyde, crotonic aldehyde, acrolein, further aromatic or heterocyclic aldehydes, such as benzaldehyde, furfurol and the like.

The term aldehydes includes not only the aldehydes themselves, but also compounds yielding aldehydes, for instance paraformaldehyde, trioxymethylene, paraldehyde, and the like.

The following description relates, in particular, to the production of formaldehyde condensation products from 2:4:6-triamino-1:3:5-triazine (melamine); however, the description applies with obvious modifications to other aminotriazines or their derivatives.

Melamine reacts surprisingly freely with neutral aqueous solutions of formaldehyde and in all molecular proportions of melamine to formaldehyde. In the cold, there are formed, by prolonged action, the methylol compounds which at suitable concentration may separate from the solution in crystalline form. At higher temperatures the methylol compounds are formed in a shorter time, for example boiling for some minutes and cooling to separate the compound. By the further action of heat, further condensation occurs with rapid formation of hydrophilic and then hydrophobic resins, the latter separating as a layer on cooling, or even while hot if the reaction is prolonged. By still further heating, there is finally formed a gummy phase, followed by hardening to an insoluble polymerisation product. Correspondingly with the desired condensation product, the reaction may be interrupted at any phase of the condensation and the product separated in known manner by filtration, evaporation, precipitation, decantation, drying or the like. In this manner the whole series of the reaction products of the methylol compounds may find practical application in many directions as hydrophilic and hydrophobic resins.

The hydrogen ion concentration has a very great influence on the speed of the reaction. In the case of neutral or feebly alkaline reaction, the condensation proceeds in general very gradually. In the case of feebly acid reaction the speed of condensation is strongly accelerated; also strong alkaline reaction accelerates the condensation.

The desired pH-value may be obtained in known manner by adding inorganic or organic acids or bases or salts thereof.

The condensation may be conducted to produce easily clear, hydrophilic or hydrophobic condensation products with all reasonable molecular ratios of melamine to formaldehyde, for example 1:1 up to 1:20. The hydrophobic properties of the condensation products are liable to be influenced profoundly by the pH-value. The separated hydrophobe resins which are not yet polymerized to a very high degree have the outstanding property of dissolving to clear solutions in acid. By addition of alkali they are again precipitated and by further addition of acid pass again into solution. These properties are not only those of the resinous condensation products from melamine but are also possessed by the melamine-methylol compounds, and they can be utilized for various purposes, for instance for the precipitation of the condensation products on fibers.

For the manufacture of commercial condensation products it is frequently not necessary to use so much formaldehyde for the reaction as may be the maximum that can be condensed, since the condensation products obtainable with a smaller proportion of formaldehyde have also good commercial properties.

The condensation may be conducted in several stages by first using either melamine or formaldehyde in excess and then causing the mixture to react in one or more stages with the component which was originally in deficiency. For example, 1 mol melamine may be caused to react with ½ mol. formaldehyde and the product treated with a further quantity of formaldehyde. However, one may also produce condensation products having much formaldehyde and then bring them into reaction with further quantities of melamine.

The reaction between melamine and formaldehyde may occur in an organic medium instead of in water, in which case there are obtained directly solutions of the respective condensation products in organic solvents, which are applicable for the manufacture of lacquers or as additions to lacquers, for example nitrocellulose lacquer. Suitable organic solvents are, for instance, ethyl alcohol, butyl alcohol, acetone, glycerine, benzyl alcohol, or the glycerides of the fatty acids of linseed oil. The condensation may also be produced in mixtures of water and organic solvents, for instance in aqueous alcohol of 50 per cent. strength.

Melamine and formaldehyde may also be condensed with exclusion of solvent, for example with the use of paraformaldehyde.

The application of solvents is advantageous when the reaction is performed in a closed vessel (autoclave), when it is possible to select a reaction temperature above the boiling point of the solvent, for instance ethyl alcohol.

The formaldehyde condensation products of melamine obtained by the reaction described have very good capacity for being hardened by heat, that is to say they are infusible and insoluble under the influence of heat. Furthermore, they are stable to light and free from intrinsic color. They are, therefore, suitable for very many purposes, for instance as masses to be cast or pressed in the industry of plastic masses, as binding agents for the production of molded or laminated products; also for adhesives, especially in the woodworking industry; in the textile industry for dressing, anti-creasing, matting and the like, as lacquer binding agents or additions to lacquers. In many of these applications, particularly in that of molded masses and laminated products, the surprising stability to heat displayed by the condensation products in the heat-hardening is of great advantage, since the operation is not limited to a narrow range of temperature but extends over a considerable temperature interval. The melamine resins are in this respect similar to the phenol-resins. The formaldehyde condensation products of melamine in their hardened condition are surprisingly quite stable to water.

Other aminotriazines or their derivatives may be converted into their corresponding condensation products with formaldehyde in manner similar to that outlined above in the case of melamine.

It is not necessary to use the aminotriazine alone in the condensation; they may be mixed with other compounds capable of forming resins with aldehydes, for instance phenols, urea, thiourea, cyanamide, dicyandiamide, sulfonamides, aniline or the like or a mixture of any of these, the products being mixed condensation products. In this case also condensation may be carried out in several stages, for example the second component may be added to a primary condensation product made with a sufficient proportion or an excess of formaldehyde. It also is possible to mix or condense further the amino-triazine condensation product with another natural or artificial resin, for instance phenol-formaldehyde, or the condensation products from urea or thiourea and formaldehyde. At any stage of the condensation other substances may be added, for instance dyestuffs, filling materials, plasticizers, water-repelling agents or the like.

It has further been found that when the reaction between the aminotriazine and the aldehyde is performed in presence of an organic medium, this latter may in some cases take part in the reaction. This is especially the case when the condensation is performed in presence of compounds containing alcoholic hydroxy groups. These compounds do not only act as solvents, plastifiants or the like but also constitutively enter into the reaction product forming new compounds the properties of which more or less differ from those of the corresponding compounds made only from aminotriazine and aldehyde viz. in the absence of compounds containing alcoholic hydroxy groups.

The following description refers especially to these products made from at least three components viz. an aminotriazine, an aldehyde and a compound containing an alcoholic hydroxy group.

The general conditions of manufacture are analogous to those described above for the production of condensation products of aminotriazines with aldehydes.

However, the following may be said especially in respect of the condensation products made with the concurrence of compounds containing alcoholic hydroxy groups.

The aminotriazines coming into question for this reaction are substantially the same as are enumerated above. As further examples there may be mentioned: 2-amino-4-hydroxy-6-chloro-1:3:5-triazine (I), 2-amino-4-hydroxy-6-phenyl-1:3:5-triazine (II), 2-methylamino-4-amino-6-chloro - 1:3:5 - triazine (III), 2:4 - diamino-6-phenylamino-1:3:5-triazine (IV), 2-amino-4:6-diphenylamino - 1:3:5 - triazine (V), 2:4:6-tri-methylamino-1:3:5-triazine (VI) and so on:

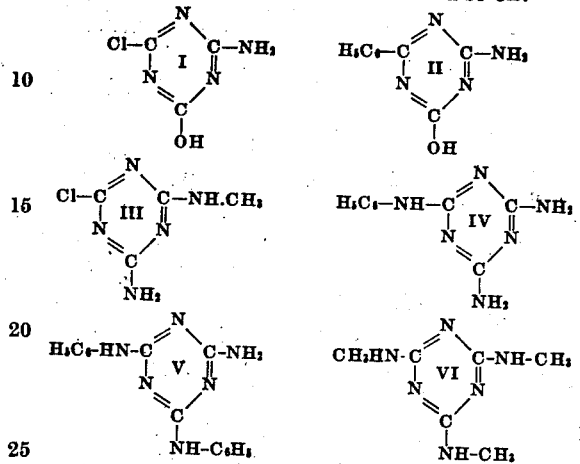

Also amino derivatives of other triazines, for instance 1:2:4-triazines may be used, such as for example 3-amino-1:2:4-phentriazine (VII), 3-amino-1:2:4-phentriazoxin (VIII) of the formula

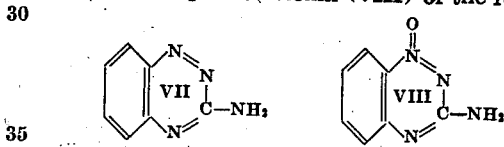

or the like

As aminotriazines there may thus be used generally those derived from the formula

wherein two A's mean —N= and the other two mean $$-\overset{|}{C}=$$

and wherein at least one of the free valencies of the nucleus is substituted by an amino group having at least one reactive hydrogen atom, the remaining free valencies being taken up by a radical selected from the group consisting of hydrogen, hydroxyl, halogen, alkyl, alkylene, aryl and aralkyl.

The aldehydes coming into question are the same as cited above.

Compounds containing alcoholic hydroxy groups suitable as components for the new condensation include mono- or polyhydric alcohols having aliphatic, aromatic, hydroaromatic or heterocyclic radicals. Also compounds which besides the alcoholic hydroxy groups contain further reactive substituents, for instance aldehyde-, keto-, carboxyl-, halogen- or amino-groups, which groups may in their turn contain substituents.

Among the individual mono- and polyhydric alcohols may be named the following: methyl alcohol, ethyl alcohol, butyl alcohol, ethyl butanol, ethyl hexanol, lauryl alcohol, cetyl alcohol, stearyl alcohol, allyl alcohol, oleyl alcohol, glycol, glycerol, erythritol, pentaerythritol, mannitol, sorbitol, benzyl alcohol, terpineol, borneol, abietinol, wool fat alcohols, furfuryl alcohol or the like.

Among mono- and polyhydric alcohols containing further substituents there may be named keto- and aldehyde alcohols like aldol, glycol aldehyde, glycerol aldehyde; the groups of the carbohydrates, for example glucose, cane sugar, trihexosane or their polymerides, such as dextrine, starches, gum arabic, tragacanth or the like; hydroxycarboxylic acids, such as tartaric acid, malic acid, ricinoleic acid, saccharic acid or their esters or the like; halogen alkyl alcohols, for instance chlorethyl alcohol, glycol chlorhydrin, glycerol chlorhydrin, chloralhydrate; amino-alcohols, for instance mono-, di- and triethanolamine or the like.

Among the polyhydric alcohols those are of importance in which some of the hydroxy-groups have been etherified or esterified. As examples of partially etherified polyalcohols there may be mentioned glycolmonoethyl ether, glycerolmono- and diethylether, for instance diethyline, also cyclohexanone glycerol ($O^\alpha$-,$O^\beta$-cyclohexylidene-glycerol). As examples of esterified polyalcohols there may be mentioned the so called ester resins having free hydroxyl groups of the type of the alkyd resins, for example the esters of glycerolphthalic acid ester, glycerol adipic acid ester or glycerol sebasic acid ester which still contain free hydroxyl groups.

Of particular value are also those polyalcohols containing at least one free hydroxyl group the remaining hydroxyl groups being at least partially esterified by a monobasic organic acid. As examples of suitable monobasic acids there may, besides the lower aliphatic acids such as acetic or propionic acid, be particularly mentioned the fatty organic acids having more than 8 carbon atoms, such as capric, lauric, myristic, palmitic, stearic, eleostearic, oleic, ricinoleic acid, further linoleic, linolenic and isolinolenic acid, the latter three being the foremost known acids of the drying oils, finally the resin acids such as colophony. As specific examples of such partially esterified polyalcohols there may be mentioned the tristearate of pentaerythritol, the mono- or diglycerides of linolenic acid or, more generally, of the fatty acids of linseed oil, further the partial glycerides of the fatty acids of China wood oil, oiticica oil, perilla oil, soya bean oil, rape oil, cotton seed oil, cocoa nut oil, fish oil, whale oil, and the like.

When using partially esterified polyalcohols of the type mentioned in the preceding paragraph, the reaction is advantageously carried out as follows: The components formaldehyde and aminotriazine or an aminotriazine formaldehyde condensation product particularly one of the initial condensation stage viz. containing methylol groups, such as for instance hexamethylolmelamine, are condensed with the partially esterified polyalcohol, for instance with a mono- or digylceride of a monobasic organic acid, or with a mixture of said mono- and diglycerides, in the presence of a low boiling monoalcohol, such as for instance methyl-, ethyl- or butyl alcohol.

Instead of the compounds containing alcoholic hydroxy groups themselves compounds may be used which are converted under the conditions of the reaction into others containing alcoholic hydroxyl groups, for example acetals, esters.

Particularly advantageous for the invention are those of the above mentioned groups which are of the type of the carbohydrates and because of their easy accessibility in nature.

The bodies which are to react may be brought together simultaneously or in any order of succession. In any case the several components may be added in stages. Obviously mixtures of the individual components may be used.

The proportions in which the components react may be varied within wide limits.

Also other condensation conditions, such as temperature, solvent or diluent, substances accelerating the reaction, for instance acids, substances that yield acid, bases or the like are subject to wide variations.

Water and organic solvents may be used as solvents, also an excess of the compound containing alcoholic hydroxy groups and serving as the condensation component may be used as the solvent.

The reaction may occur in a closed vessel (autoclave) in which case the temperature of the reaction may be above the boiling point of one or other of the components or the solvent.

The reaction may occur also in absence of a solvent or diluent.

The properties of the new condensation products vary according to the parent material selected as well as the conditions of the reaction. Thus it is possible to produce products which are characterized by lack of color as well as excellent stability to light and heat and of resistance to chemical action. Their solubility may be varied within wide limits. Products may be obtained which are soluble in water, others which are soluble in organic solvents and yet others which are insoluble in all the usual solvents. The products have for the most part a resinous nature and may belong both to the type of resin which can be hardened and that which cannot be hardened. In the case of those which are capable of being hardened this conversion may be effected by known methods, for example by heating or catalytic action. The products which cannot be hardened may be converted into those which can be hardened by, for instance, the addition of a further proportion of aldehyde, particularly formaldehyde or an agent yielding aldehyde.

In view of the many variations in the properties of the new products, their application are numerous.

The rapidly hardening products either alone or in admixture with plasticising agents or filling agents like fibrous materials yield molding powders which can be shaped in a hot press. The molded articles are of good stability to water and heat and have good mechanical properties.

The new products are suitable quite generally as binding agents, for instance for gluing wood, paper, textile fabrics, for the production of artificial wood from fibrous material, artificial cork, brush cements, for fixing coloring materials, also for the production of insecticides and the like on any kind of support.

The products may also be used for impregnating textile webs and then for binding these to form homogeneous laminated bodies by means of the hot press.

A further extensive use for the new materials is in the lacquer industry. In this connection particularly those products are very valuable which are obtained when as the ether group such partially esterified polyalcohols are used the ester groups of which are derived from saturated or unsaturated fatty acids (cf. column 12 hereinbefore, last paragraph). The products may be used alone as lacquers. They may also be added to lacquers in order thereby to make these harder or more stable to water. They are also important as additions to air drying oils, for the purpose of making varnishes.

The new products may also be used for making shaped bodies by a casting process; in this case there may be obtained bodies clear as glass and resistant to water as well as of good mechanical strength.

In textile chemistry the new substances find a wide application, for instance as finishes, as non-creasing agents, for diminishing a capacity for swelling, as thickening or stiffening agents or as softening agents, as agents for making fillers or finishes fast to water, in the preparation of dyed or printed material.

The properties of the products may be further modified if the reaction components viz. amino-triazines, bodies containing alcoholic hydroxy groups and aldehydes are used with the simultaneous or subsequent addition of further bodies which are capable of reacting with an amino-group, an alcoholic hydroxy group or an aldehyde group. As such additions may be named, for example, amines, amides, for instance aniline, urea, thiourea, sulfamide, phenols, acid chlorides or the like. Such an addition is advantageous, for example, when one of the three primary components is used in excess. In this case mixtures of various condensation products are produced.

When aminotriazines, aldehydes and compounds containing alcoholic hydroxy groups are used which contain besides their amino group or groups, alcoholic hydroxy group or groups and/or aldehyde group or groups respectively still further reactive groups, for instance halogen, carboxyl, carbonyl, hydroxyl or amino groups, it is possible to cause these groups to enter wholly or in part into reaction with further reactive bodies such as acid chlorides or anhydrides, alcoholates, salts of carboxylic acids, amines or amides. For this reaction substances are also applicable which are on their own account capable of entering into reaction simultaneously or subsequently with further reactive bodies.

It is also possible to mix the new condensation products with artificial or natural resins or to condense them therewith. Also at any stage of the condensation further substances, for instance dyestuffs, fillers, softeners, dehydrating agents or water-proofing agents may be added.

The following examples illustrate the invention, the parts being by weight unless otherwise stated and the parts by volume and the parts by weight bearing the relationship to one another as that of the litre to the kilo:

Example 1

A mixture of 12.6 parts (0.1 mol.) of melamine of the formula

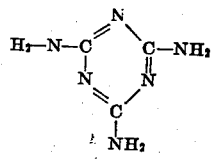

and 75 parts by volume (0.8 mol.) of neutral formaldehyde solution of 32 per cent. strength by volume are heated together in the boiling water-bath until dissolved and the heating is continued for 10 minutes. On cooling flocks separate. After 2 days the crystalline magma is filtered, thoroughly washed with alcohol and dried for 5 hours at 60° C.

The product is a powder of crystalline appearance under the microscope.

Its analysis indicates the formula:

$C_3H_6N_6.6CH_2O.H_2O$

|  | C | H | N |
|---|---|---|---|
| calculated | 33.2 | 6.2 | 25.9 |
| obtained | 33.2 | 6.2 | 26.5 |

It melts at about 150° C. to a clear liquid which by further heating passes into a glassy, hard product insoluble in water.

In quite analogous manner there may be produced instead of the hexamethylol-compound other methylol compounds by using a smaller proportion of formaldehyde. These methylol compounds are soluble in hot water and crystallize again on cooling. On addition of acid solutions are obtained which remain clear when cold and are suitable, in particular, as impregnating agents, for instance for textiles.

Example 2

126 parts of melamine (1 mol.), 360 parts by volume of alcoholic formaldehyde solution of 41.8 per cent. strength (5 mol.), 300 parts by volume of alcohol and 1 part by volume of concentrated hydrochloric acid (0.01 mol.) are heated together under reflux to boiling. After about 15 minutes the whole is dissolved. After 45 minutes, the clear solution is cooled. If a sample thereof is diluted with water a resin separates immediately. A sample poured upon glass and hardened at 150° C. yields a hard, clear film.

Example 3

50 parts of a methylol-compound of melamine, obtained as described in Example 1, are added to 80 parts by volume of butyl alcohol and 0.5 part by volume of concentrated hydrochloric acid and the mixture is heated to boiling for ¼ hour. A quite clear solution is obtained which dries and hardens quickly to a hard varnish when heated to a thin layer. Such solutions in butyl alcohol may be added, for example, to nitrocellulose lacquers in order to lend them hardness and filling capacity.

Example 4

126 parts of melamine (1 mol.) are condensed with 280 parts by volume of neutral formaldehyde solution of 32 per cent. strength by volume (3 mol.) in a reflux apparatus on an open flame by boiling for 30 minutes and the solution obtained is evaporated in a vacuum at about 60° C. to produce a thick syrup. The latter, preferably after addition of a softening agent, for example glycerine, is poured into molds and hardened by gradually increasing the temperature.

The cast masses have an appearance as bright as water and clear as crystal and are of good hardness and stability to water.

Example 5

50 parts of nitrocellulose ("½-second-wool") are dissolved in a mixture of 10 parts of tricresyl-phosphate, 10 parts of butyl alcohol, 50 parts of ethylacetate and 40 parts of toluene. Into this very thick pasty solution there are stirred 100 parts of an alcoholic solution of melamine resin (see Example 2). The solution thus obtained is as clear as water and is diluted for use with a mixture of equal parts of toluene, absolute alcohol and ethylacetate. The solution is cast on glass or metal and dried, and yields a layer which is as clear as water and as smooth as a mirror and hardens when the temperature is gradually increased, and when finally a temperature of 120° C. has been applied for half-an-hour yields films of very good stability to water and of good hardness.

*Example 6*

70.8 parts (0.2 mol.) of symmetrical triphenylmelamine of the formula

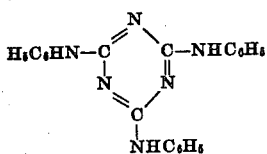

are dissolved in a reflux apparatus on the boiling water-bath together with 63.5 parts by volume of alcoholic neutral formaldehyde of 42.6 per cent. strength by volume (0.9 mol. $CH_2O$), 0.6 part by volume of concentrated sulfuric acid and 63.5 parts by volume of alcohol of 95 per cent. strength. After some minutes a clear solution is produced which after being cooled in ice-water becomes opalescent. The condensation product thus formed is neutralized with alcohol caustic soda and then completely precipitated by addition of ice-water. It is separated from water by filtration and is dried at 60° C. in a drying chest. There is produced a white powder which when melted at 150–200° C. becomes a brittle, clear resin, insoluble in alcohol and benzine but soluble in benzene, toluene, acetone or the like.

*Example 7*

A mixture of 7.3 parts of finely pulverized 2-chloro-4.6-diamino-1.3.5-triazine (mono-chloro-melamine) of the formula

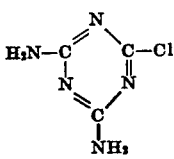

($^1/_{20}$ mol.), 22 parts by volume of formaldehyde of 40.8 per cent. strength by volume ($^6/_{20}$ mol.), 12 parts by volume of alcohol of 95 per cent. strength and 1 part by volume of sulfuric acid of 50 per cent. strength by volume is heated to boiling in the water-bath while shaking, whereby everything is dissolved in the course of a few minutes. The solution then becomes turbid and it is therefore further boiled in a reflux apparatus on the open flame for about ½ hour until a clear solution is produced. The latter is evaporated in a vacuum, whereby a condensation product, in the form of a syrup clear as crystal, is obtained. By diluting with water, alcohol or alkali solution the product is precipitated in the form of white amorphous precipitate.

If, for example, the white precipitate obtained from 10 parts of this syrup by neutralizing it with NaOH is ground finely with 15 parts by volume of alcohol there is obtained a suspension which can be coated. If this is applied as a thin layer on veneer wood laid cross-wise and glued for half-an-hour at 100° C. under a pressure of 5–10 kilos per sq. cm. a normal veneer plate of good resistance to water is obtained.

If, for example, 15 parts of the acid chloro-melamine-resin in the form of syrup are mixed with 7 parts of wood-meal, the mixture dried at 60° C. and ground together with 0.6 part of calcium carbonate there is obtained a molding powder which, when molded at 150–160° C. under a pressure of about 300 kilos per sq. cm. yields mechanically very strong, bright brown, transparent products of good stability to water.

*Example 8*

6.3 parts of melamine ($^1/_{20}$ mol.), 15 parts by volume of alcoholic formaldehyde of 41.8 per cent. strength by volume (about $^4/_{20}$ mol.), 15 parts by volume of absolute alcohol, 0.1 part by volume of concentrated hydrochloric acid ($^1/_{100}$ mol.) and 6 parts of the mono-glyceride of linolenic acid are caused to react with each other for 3½ hours under reflux on the boiling water-bath. There is produced a somewhat turbid, feebly yellowish, oily liquid, which, on further evaporation finally solidifies to a tough, clear, gummy mass. If, however, the oily condensation product before solidification is diluted with some benzene, preferably after addition of siccative, and applied on a support and dried in the air, there is obtained after some time a clear, transparent, hard coating which can no longer be scratched by the finger nail.

*Example 9*

4.7 parts of melam of the formula

($^2/_{100}$ mol.) are mixed with 20 parts by volume of formic acid and 8.5 parts by volume of an alcoholic solution of formaldehyde of 42.8 per cent. strength by volume ($^{12}/_{100}$ mol.) and 1 part by volume of sulfuric acid of 50 per cent. strength are added and the whole is heated in the oil bath at 110° C., whereby the alcohol is in greater part evaporated. After about 30 minutes an almost completely clear solution of the condensation product is formed, which rapidly becomes oily and finally gelatinous.

If the condensation solution before it gelatinizes is poured on glass and kept in an oven at 60° C. it first gelatinizes and then hardens to a hard, clear film.

If the condensation solution is mixed with alcohol, water, a solution of base or the like, a white, amorphous product is precipitated.

If the condensation solution is diluted however, for example with hot formic acid, there is obtained a solution which, according to the degree of dilution, may be completely diluted with water or, when diluted with water, yield opalescent to whitish colloidal solutions from which by salting out or neutralization the amorphous condensation product of melam is precipitated.

*Example 10*

A mixture of 126 parts of melamine (1 mol.), 214 parts of an alcoholic solution of formaldehyde of 42 per cent. strength (3 mol.), 200 parts of absolute alcohol and 1 part of concentrated hydrochloric acid (about 0.01 mol.) is heated to boiling for 1 hour. The solution thus produced is neutralized with 1.3 parts of caustic soda solution of 30 per cent. strength, filtered, if desired, and kept at the boil for 3 hours; it is then cooled. There is produced a clear condensation solution which leaves a clear varnish when dried. The solution may be used alone as a varnish or in conjunction with other substances having a plasticising effect or forming varnishes which are known in the lacquer industry.

If a sample is evaporated to a constant weight on the boiling water bath in a vacuum of about 10 mm. there is produced a foamy product the weight of which is about 19 per cent. higher than that of the parent melamine and formaldehyde. Taking into consideraton the formation of a few per cent. of water in the reaction it may be concluded that in this condensation product 1 mol. of melamine has been condensed with about 1 mol. of ethyl alcohol.

*Example 11*

A mixture of 126 parts of melamine (1 mol.) and 300 parts of neutral formaldehyde solution of 30 per cent. strength (3 mol.) is heated on the boiling water bath until a sample diluted with water yields a precipitate of resin. The solution is then evaporated to dryness in a vacuum and further treated at 100° C. for 1 hour in a vacuum.

5 parts of this product are treated at 130° C. with 8 parts of pure benzyl alcohol. A clear solution is obtained in a short time; a sample of it, however, gives a further precipitate on cooling. After a few minutes a sample remains clear on cooling but on addition of benzyl alcohol gives a precipitate. The solution continues to evolve water and formaldehyde. After ½ hour the viscosity has risen considerably. A sample when mixed cold with any desired proportion of benzyl alcohol or with a limited proportion of benzene remains clear. The whole is dried in a vacuum of about 0.07 mm. of mercury at 100° C. until the weight is constant, whereby there is obtained a product which is glass-clear and of foamy structure: its weight is now about 28 per cent. higher than that of the quantity of melamine formaldehyde condensation product used.

By further condensation at 130° C. the condensate after about ¾ hour becomes highly viscous and has a tendency to gelatinize. A sample of this product dried at 100° C. in a vacuum under a pressure up to 0.04 mm. of mercury until the weight is constant and finally in the form of powder shows an increase of weight of 38 per cent.

For 1 mol melamine, therefore, approximately ¾ mol benzyl alcohol has been condensed in the new product.

*Example 12*

126 parts of melamine (1 mol.) are dissolved in 650 parts of a neutral solution of formaldehyde of 30 per cent. strength (6.5 mol.) heated to 90° C.; the solution is kept at 90° C. for 5 minutes and then cooled. When the temperature has fallen to 60° C. 600 parts of alcohol are added and the cooling is continued. The white mass which has separated is filtered, washed with aqueous alcohol of 50 per cent. strength and dried. The product consists in greater part of hexamethylolamine $C_3N_6(CH_2OH)_6.H_2O$.

100 parts of this product are dissolved in 200 parts by volume of methanol under addition of 5 parts by volume of a $n/1$ solution of hydrochloric acid in methanol at boiling temperature. The solution is kept boiling for some hours and then evaporated in vacuo. A clear resin is obtained which may be used for instance as a lacquer or lacquer substitute.

From the determination of the methoxy content according to the method of Zeisel it results that the resin has chemically bound 3 moles of methanol for each mol of melamine.

*Example 13*

324 parts of the hexamethylol melamine made according to Example 12, paragraph 1 (1 mol.) are treated on the boiling water bath whilst stirring with a solution of 10 parts of hydrochloric acid (0.1 mol.), 200 parts of ethyl alcohol and 1400 parts of ethyl-2-hexanol. After 20 minutes a slightly turbid solution is produced. After 1 hour, the whole is cooled. The product consists of two layers; 500 parts of it are distilled in a vacuum on the boiling water bath whereby a homogeneous solution is produced. This is filtered if necessary and then evaporated in a vacuum to a thick syrup. This syrup is soluble in benzene and benzine and any other solvents.

*Example 14*

120 parts of para-formaldehyde (4 mol.) are dissolved in 1200 parts of allyl alcohol with the aid of heat and 126 parts of melamine (1 mol.) are added. The mixture is heated to boiling. In a few minutes a clear solution is produced and this is maintained for 4 hours at the boil and then evaporated at 100° C. first in a vacuum of 10 mm. and then in a vacuum of about 0.1 mm. until all odour has disappeared. There is obtained a fusible resin which is viscous at 100° C. and solidifies when cold. At 150° C. it gradually hardens.

*Example 15*

126 parts of finely ground melamine (1 mol.), 450 parts of an alcoholic solution of formaldehyde of 40 per cent. strength (6 mol.) and 1 part of concentrated hydrochloric acid (0.01 mol.) are together heated in the boiling water bath for 10–15 minutes until all is dissolved. There are then added 100 parts of cetyl alcohol and the whole is treated in the boiling water bath for 1 to 1½ hours and then cooled. Instead of cetyl alcohol, lauryl alcohol, stearyl alcohol, oleyl alcohol, terpineol, alcohols of wool fat, castor oil, tartaric acid diethyl ester, diethyline (glyceroldiethyl ether), glycerolmonochlorhydrin, cyclohexanonglycerol ($O^a.O^\beta$ - cyclohexylidene - glycerol) or the like may be used. In all cases a clear solution is produced which on cooling either remains clear or becomes a white viscous liquid or paste. Independently of this appearance all the products are glass-clear when they are dissolved in acetone or when the volatile solvent has been evaporated.

*Example 16*

126 parts of melamine (1 mol.) are condensed with 300 parts of neutral formaldehyde solution of 30 per cent. strength (3 mol.) until a cooled sample of the clear solution yields a precipitate of resin when diluted with water. 100 parts of glycerol are now added and the mixture distilled in the boiling water bath in a vacuum of 12 mm. The internal temperature gradually rises to 92° C. The distillation of water has then practically ceased, but the product is still treated for 2 hours in a vacuum of about 12 mm. and then for 1 hour in a vacuum of about 3–4 mm. in the boiling water bath. The clear mass is cast into a mould and hardened for 20 hours at 110° C. There is produced a clear, very hard and mechanically good casting.

Instead of glycerol another alcohol may be used, for instance glycol.

*Example 17*

126 parts of melamine (1 mol.) are dissolved in the boiling water bath in 200 parts of neutralized formaldehyde solution of 30 per cent. strength (2 mol.) and are kept in the water bath until a cooled sample yields a precipitate of resin immediately on mixing with an equal quantity of water. 70 parts of water are then distilled in a vacuum and the mass mixed with 55 parts of glycerol, 110 parts of wood flour and a colouring matter and then kneaded on hot rollers until a skin is produced. The latter is comminuted. The product thus obtained may be moulded in a hot press, for example at 145° C., for 3 minutes to produce a good hard molding which after 24 hours' immersion in cold water increases 1 per cent. in weight and after 10 minutes' immersion in boiling water increases 1.5 per cent. in weight.

*Example 18*

126 parts of finely ground melamine (1 mol.), 450 parts of an alcoholic solution of formaldehyde of 40 per cent. strength (6 mol.) and alcoholic hydrochloric acid (0.01 mol.) are treated together in the boiling water bath until all has dissolved. The solution is now mixed with 0.01 mol. of alcoholic caustic soda (solution A).

(a) The solution A is mixed with 372 parts of ricinoleic acid mono-glyceride (1 mol.) and 200 parts of absolute alcohol. There is produced a clear solution which is kept for 5 hours at the boil. The product thus obtained is poured on to a support and dried in the oven; there is produced a clear soft film.

(b) 148 parts of phthalic anhydride (1 mol.) and 92 parts of glycerol (1 mol.) are kept together at 160° C. for 22 hours. There is produced a resin having an acid number of 70. This resin is mixed with the solution A, 200 parts of benzene and 200 parts of absolute alcohol and the whole is kept at the boil for 5 hours. There is produced a clear solution which may be used as a varnish.

(c) 92 parts of glycerol (1 mol.), 148 parts of phthalic anhydride and 200 parts of absolute alcohol are dissolved in solution A and the solution thus obtained is treated in the form of a thin layer in the oven. There is obtained in this manner a very hard lacquer.

*Example 19*

146 parts of adipic acid (1 mol.) and 101.2 parts of glycerol (1.1 mol.) are heated together first for 1 hour at 155–160° C. and then within 1½ hours gradually to 230° C. until the limit of gelatinization has been attained and the acid number is 30.7 whereupon the whole is immediately cooled and dissolved in a mixture of 100 parts each of absolute alcohol and benzene.

63 parts of melamine (0.5 mol.) are boiled together with 225 parts of alcoholic formaldehyde solution of 40 per cent. strength (3 mol.) until an almost clear solution is produced.

These two solutions are mixed and the mixture is boiled for 12 hours. The solution thus obtained dries on a support to dazzling clear lacquer.

*Example 20*

126 parts of melamine (1 mol.), 126 parts of mannitol and 500 parts of commercial formaldehyde solution of 36 per cent. strength (6 mol.) are condensed together for 1½ hours at 70° C. and then evaporated in a vacuum to dryness. The product thus obtained is moulded for 6 minutes in the hot press at 150° C. whereby transparent mouldings are produced which, when immersed in cold water for 24 hours increase in weight by 1 per cent. and when treated for 10 minutes in boiling water increase in weight by 1.8 per cent.

*Example 21*

126 parts of melamine (1 mol.), 126 parts of cane sugar and 600 parts of neutral formaldehyde solution of 30 percent. strength (6 mol) are heated together in the boiling water bath until a sample of the clear solution diluted with water yields a true separation of resin. The condensation solution is then dried in a vacuum to a product of foamy structure which is comminuted and after-treated at 100° C. until a fluidity favourable for moulding in the hot press has been obtained. If this product is moulded for 6 minutes at 145° C. there is produced a hard glass-clear moulding which when stored in water for 24 hours increases in weight by 0.1 per cent. and when boiled in water for 10 minutes increases in weight by 2.3 per cent.

If, instead of sugar, trihexosane (compare Helv. Chim. Acta, vol. 5, page 642, 1922) or soluble starch is used and the procedure is analogous there is obtained a moulding which is also glass-clear; this increases in weight after immersion for 24 hours in water 0.4 per cent. or 0.5 per cent. and when treated for 10 minutes in boiling water 0.6 per cent. or 2.6 per cent. By subsequently storing the moulding thus treated with water the new weight changes a little. The weight, however, is never below the original weight.

*Example 22*

126 parts of melamine (1 mol.), 126 parts of trihexosane and 600 parts of neutral formaldehyde solution of 30 per cent. strength (6 mol.) are treated for 40 minutes in the boiling water bath. The condensation product thus obtained is then brought to dryness in a vacuum. The dry product is soluble to a clear solution in a limited quantity of cold water.

100 parts are mixed with 6 parts of ammonium sulfate and the mixture is dissolved in 50 parts of water. Canadian birch veneers of 2 mm. thickness are painted with the solution and laminated in the usual manner to a three-ply wood which is then pressed for 12 minutes under a pressure of at least 4 kilos per sq. c., at 100° C. The glueing is stable to boiling water and of high strength.

*Example 23*

252 parts of melamine (2 mol.), 400 parts of commercial formaldehyde of 30 per cent. strength (4 mol.) and 370 parts of cane sugar are heated together on the water bath for ¼ hour. When a sample yields a precipitate of resin on dilution with water a condensation solution is kneaded with 270 parts of cellulose and the mixture is dried and ground. The powder thus obtained is moulded, for example for 2 minutes at 175° C. whereby mouldings are produced which, when stored in cold water increase in weight by 4 per cent. and when treated for 10 minutes in boiling water increase in weight by 2.2 per cent.

*Example 24*

12.6 parts of melamine (0.1 mol.), 60 parts of glucose (0.33 mol.), 160 parts of water and 10 parts of n-hydrochloric acid (0.01 mol.) are heated together to boiling for 4 hours. A turbid solution is produced which yields flocculent and granular precipitates on cooling. The whole is mixed with 60 parts of formaldehyde solution of 30 per cent. strength (0.6 mol.) and the mixture is heated for 2 hours to boiling. There is produced a quite clear solution which solidifies to a clear highly viscous mass on cooling. It may be diluted with water to form a feebly opalescent solution. The addition of alkali lye produces a precipitation.

This product may be used, for example, as a thickening agent in various branches of industry, for example in textile chemistry.

*Example 25*

126 parts of melamine (1 mol.), and 131 parts of paraformaldehyde (4.4 mol.) are dissolved together in 1250 parts of fused choralhydrate and the solution is kept at the boil for about 2 hours until it has become viscous. The product is now treated in a vacuum of about 10 mm. in the boiling water bath until it is hard and capable of being powdered. 1 part of the powder is further treated at 100° C. in a vacuum of 0.1 mm. After 10 hours diminution of weight has practically ceased and the odour of chloral has almost completely disappeared. Having regard to the total weight the final product obtained in this manner amounts to about 500 parts. The product contains, therefore, chloral to an amount which is two-fold that of the melamine.

*Example 26*

126 parts of finely pulverised melamine (1 mol.), 450 parts of alcoholic formaldehyde solution of 40 per cent. strength, (6 mol.) and 0.01 mol. of alcoholic hydrochloric acid are together heated in the boiling water bath until all has dissolved. 120 parts of urea (2 mol.) are now added and the mass further treated in the boiling water bath for about ½ hour. The solution thus obtained is viscous when cold. It may be diluted with alcohol and may be used as a varnish.

*Example 27*

126 parts of melamine (1 mol.), 180 parts of para-formaldehyde (6 mol.) and 660 parts of glycerol chlorhydrin are together kept at 90° C. for 3 hours. The clear solution is then mixed with 3000 parts of water and thoroughly stirred. There separates a resin of silky lustre. The mixture is then cooled with ice while kneading. In this manner the resin acquires a tough consistency. The supernatant, nearly clear water is poured off and the resin is kneaded with 500 parts of water for the purpose of further washing it. The resin separated from the washing water is now dried in a vacuum at a moderate temperature and then dissolved in 900 parts of glycol-monomethyl ether. The clear solution A thus obtained contains about 30 per cent. of resin and the resin itself contains about 11 per cent. of chlorine. There is therefore more than 1 mol. of glycerol chlorhydrin present in the resin per mol. of melamine.

1300 parts of solution A (containing about 1 mol. of melamine) and 320 parts of dry potassium linoleate (1 mol.) dissolved in 320 parts of glycol monomethyl ether are mixed together and the mixture is heated to boiling. After 2½ hours, as will be apparent from the quantity of potassium chloride which has separated, the larger part of the potassium soap has been decomposed. The mixture is kept at the boil for 9 hours. After this time the reaction is practically complete. The clear solution thus obtained is separated from the deposited potassium chloride and may be used as a varnish.

*Example 28*

202 parts of 2:4-diamino-6-pnenylamino-1:3:5-triazine (1 mol.) and 318 parts of benzaldehyde (3 mol.) are dissolved in 250 parts of boiling butanol and the solution is kept at 100° C. for ½ hour. There is produced a solution which remains clear in the cold and solidifies in the oven to a hard clear varnish.

*Example 29*

278 parts of 2-amino-4:6-diphenylamino-1:3:5-triazine (1. mol.), 300 parts of an alcoholic solution of formaldehyde of 40 per cent. strength (4 mol.) and 300 parts of absolute alcohol are kept at the boil for 1-2 hours. There is produced a clear solution which, when dried, leaves a clear varnish.

*Example 30*

200 parts of 2-amino-4-hydroxy-6-phenyl-1:3:5-triazine (1 mol.) and 90 parts of paraformaldehyde (3 mol.) are mixed with 600 parts of glycol. The mixture is first kept at the boil for about 10 minutes until a clear solution is produced; the latter is then treated for ½ hour at 150° C. There is produced a solution which remains clear in the cold.

*Example 31*

163 parts of 3-amino-1:2:4-phentriazoxine (1 mol.), 300 parts of formaldehyde solution of 30 per cent. strength (3 mol.), 100 parts of n-hydrochloric acid (0.1 mol.) and 1000 parts of water are together heated in the water bath. After few minutes resinous clumps form in the mixture. The whole is treated while kneading for another ¼ hour in the water bath and then cooled. The solidified resin is comminuted, filtered, washed and dried.

1 part of this resin is dissolved together with 0.6 part of glycol in 50 parts of ethyl-2-butanol with aid of heat. On cooling the resin precipitates again. The mixture is now kept at the boil for 8 hours. After this treatment precipitation does not take place on cooling. The solution is clear and on evaporation leaves a resin which is hard and clear when cold.

*Example 32*

600 parts of purified linseed oil are heated for 1½ hours, with exclusion of air, with 82 parts of pure glycerine and 0.7 part of caustic soda. 50 parts of the thus obtained mixture of mono- and diglycerides of the linseed oil fatty acids are dissolved in 70 parts of butanol, whereupon 5 parts of technical lactic acid and 32 parts of hexamethylolmelamine are added. The mixture is then heated in a reflux apparatus up to about 100° C. for 2 hours and ll water formed thereby distilled off on the descending cooler, while constantly replacing the butanol distilled over. The resin solution is filtered, if necessary, and then evaporated in vacuo at a temperature below 100° C. The tough viscous resin thus resulting dissolves in benzene hydrocarbons or mixtures thereof with lacquer benzine or butanol. The solutions when sprayed on surfaces cure at 150° C. within 30-60 minutes to form elastic, hard and water resistant coats.

*Example 33*

200 parts of wood oil are heated in a stream of nitrogen for 1½ hours up to 245° C. with 400 parts of purified linseed oil, 82 parts of pure glycerine and 0.7 part of caustic soda. 30 parts of the mixed glyceride thus obtained containing free hydroxyl groups are dissolved in 70 parts of ethanol together with 20 parts of a linseed oil glyceride obtained according to Example 32, whereupon 22 parts of hexamethylolmelamine and 1.5 parts of phthalic anhydride are added. After boiling the mixture in the reflux apparatus for 1 hour, complete solution is obtained. The water formed is then eliminated by means of benzene or toluene vapors led through the mixture, whereupon the resin solution is filtered and brought to the desired concentration by evaporation in vacuo. The clear viscous lacquer thus obtained dissolves in lacquer benzine and toluene. By admixture of siccatives clear lacquers are obtained which dry in the air to form resistant coats.

Example 34

460 parts of linseed stand oil (cf. Ellis "Chemistry of Synthetic Resins," 1935, pages 199 and 1216) are heated in the nitrogen stream for 1 hour to 250° C. with 65 parts of pure glycerine and 1 part of caustic soda solution of 40 per cent. strength. 47 parts of the product thus obtained representing a mixture consisting mainly of mono- and diglycerides of linolenic acid are dissolved in 67 parts of butanol, whereupon 5 parts of technical lactic acid and 43 parts of hexamethylolmelamine are added and the mixture is heated, while stirring, in an oil bath at the descending cooler at an external temperature of 130° C. A mixture of butanol and water distils off, care being taken that the butanol distilled off is constantly replaced. After about 5 hours the mixture is evaporated in vacuo, diluted with toluene and filtered. A lacquer is obtained which when stoved at 150° C. yields clear, elastic and water resistant films.

Example 35

300 parts of colophony and 300 parts of linseed oil are heated in a nitrogen stream for 1 hour to 250° C. with 150 parts of pure glycerine and 0.9 part of caustic soda. At the end of the reaction the glycerine in excess is eliminated by intensifying the nitrogen stream. 47 parts of the resulting mixture of mono- and diglycerides are dissolved in 70 parts of butanol, whereupon 32 parts of hexamethylolmelamine and 1.5 parts of phthalic anhydride are added. The mixture is then heated while stirring in an oil bath for about 5 hours at an external temperature of 130° C. so that a mixture of butanol and water slowly distils off, the butanol being constantly replaced. Then the mixture is evaporated in vacuo and a solution in a suitable solvent is made. A lacquer is obtained which already at 105° C. yields hard clear coats. When the curing temperature is 150° C., extraordinary short baking temperatures are needed. The coats are highly water resistant.

Example 36

30 parts of a mixed colophony linseed oil glyceride as used in Example 35 are dissolved in 70 parts of butanol together with 20 parts of castor oil and 1.5 parts of phthalic anhydride, whereupon 32 parts of hexamethylolmelamine are added. The working up of the mixture is the same as described in the foregoing example. The resulting lacquer, when heated to 150° C., yields in a very short time clear, hard and smooth coats of good elasticity and extraordinary resistance even towards boiling water. Hardening may be effected already at 105° C. within 1 or 2 hours.

Instead of an alcoholic solution of a methylolmelamine an ether of methylolmelamine with a low boiling monoalcohol may be used for condensation with the partially esterified polyalcohol.

What we claim is:

1. A process for the manufacture of condensation products characterized by causing to react, in presence of a low boiling monoalcohol, a formaldehyde condensation product of an aminotriazine of the formula

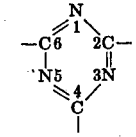

wherein at least one of the free valencies of the nucleus is substituted by an amino group having at least one reactive hydrogen atom, the remaining free valencies being taken up by a radical selected from the group consisting of hydrogen, hydroxyl, halogen, alkyl, alkylene, aryl and aralkyl, with the monoglyceride of linolenic acid, said linolenic acid being the sole acid constituent of the said monoglyceride.

2. The new condensation products useful in the manufacture of lacquers and varnishes, obtained by causing to react, in presence of a low boiling monoalcohol, a formaldehyde condensation product of an aminotriazine of the formula

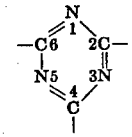

wherein at least one of the free valencies of the nucleus is substituted by an amino group having at least one reactive hydrogen atom, the remaining free valencies being taken up by a radical selected from the group consisting of hydrogen, hydroxyl halogen, alkyl, alkylene, aryl and aralkyl, with the monoglyceride of linolenic acid, said linolenic acid being the sole acid constituent of the said monoglyceride.

GUSTAV WIDMER.
WILLI FISCH.

REFERENCES CITED

The following references are of record in the file of this patent:

UNITED STATES PATENTS

| Number | Name | Date |
| --- | --- | --- |
| 2,294,590 | West | Sept. 1, 1942 |

FOREIGN PATENTS

| Number | Country | Date |
| --- | --- | --- |
| 867,109 | France | June 30, 1941 |

Certificate of Correction

Patent No. 2,448,338.  August 31, 1948.

GUSTAV WIDMER ET AL.

It is hereby certified that error appears in the printed specification of the above numbered patent requiring correction as follows: Column 8, lines 69 and 70, for "column 12 hereinbefore, last paragraph" read *column 7 hereinbefore, second paragraph*; and that the said Letters Patent should be read with this correction therein that the same may conform to the record of the case in the Patent Office.

Signed and sealed this 30th day of November, A. D. 1948.

[SEAL]

THOMAS F. MURPHY,
*Assistant Commissioner of Patents.*